July 23, 1963    F. W. KULICKE, JR., ETAL    3,098,596
MEASURING AND FEEDING APPARATUS
Filed July 15, 1958    5 Sheets-Sheet 1
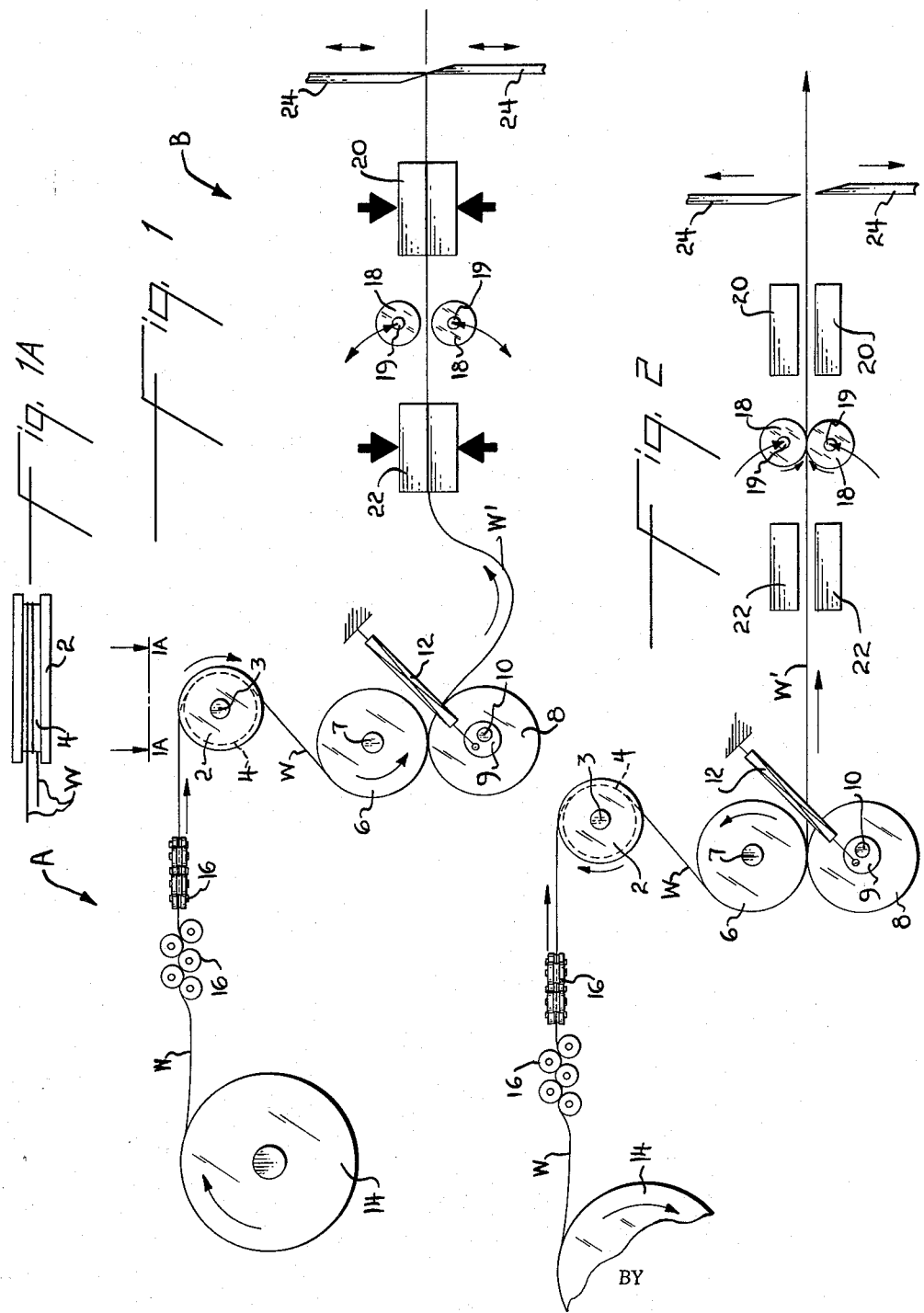

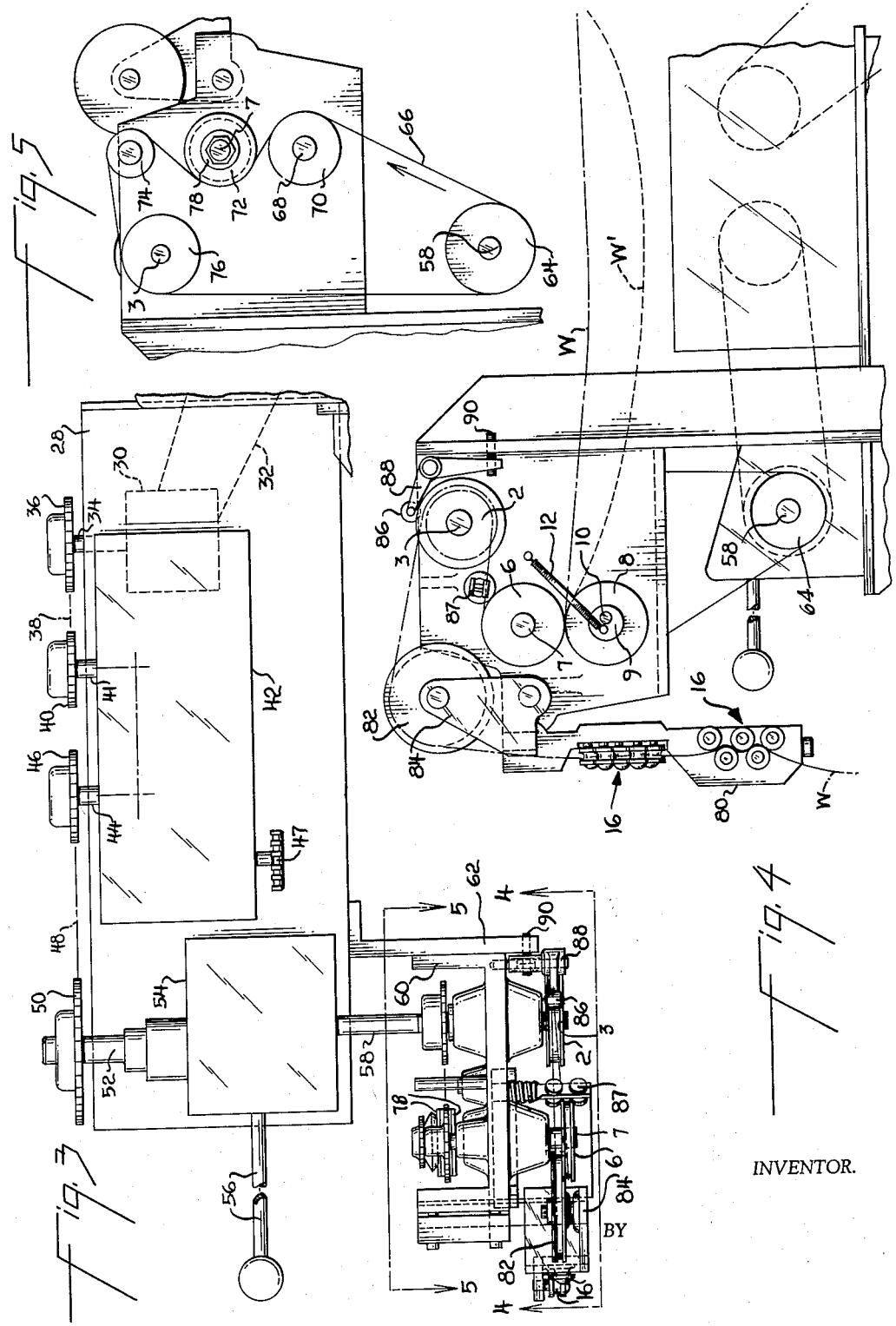

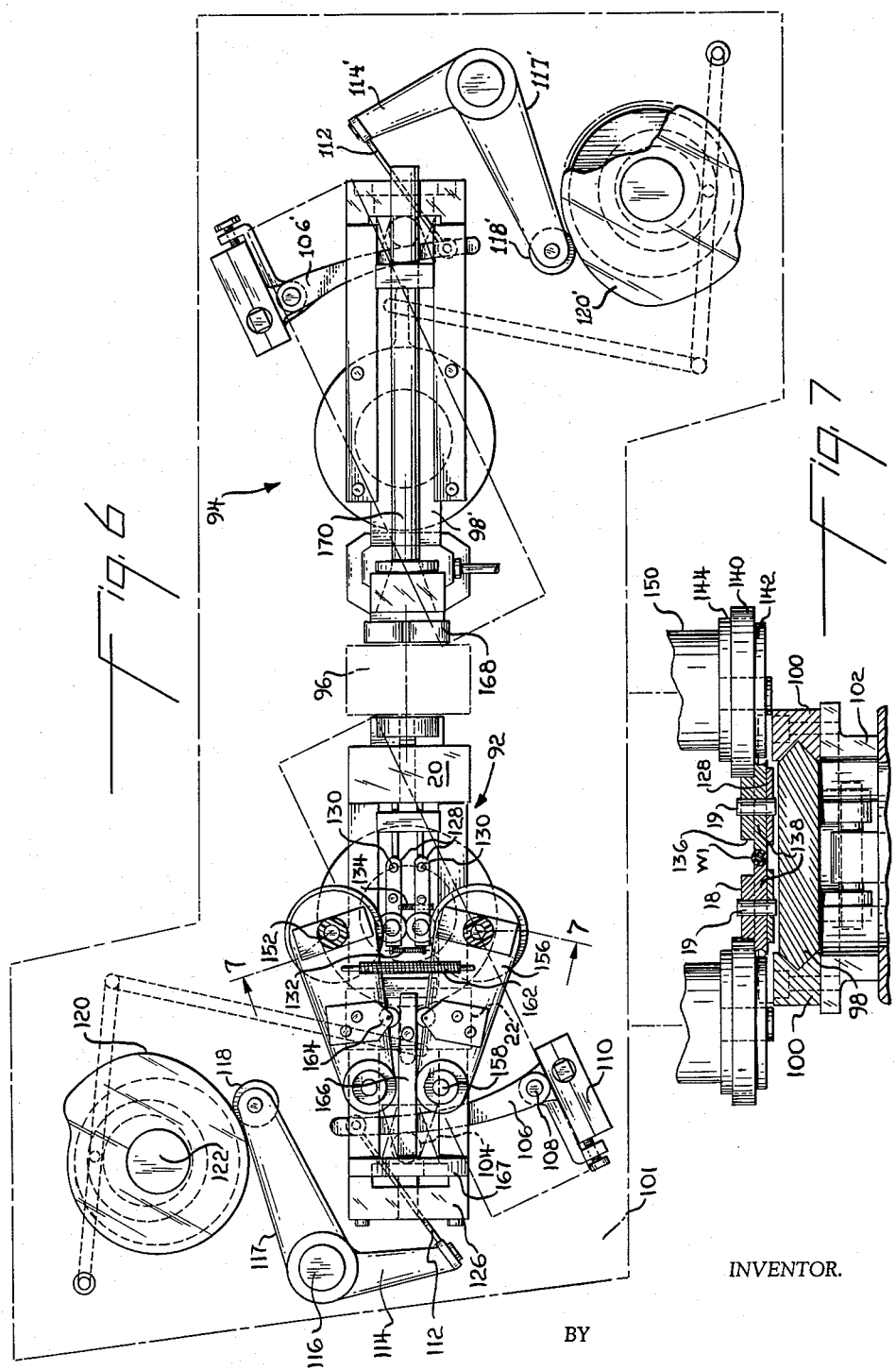

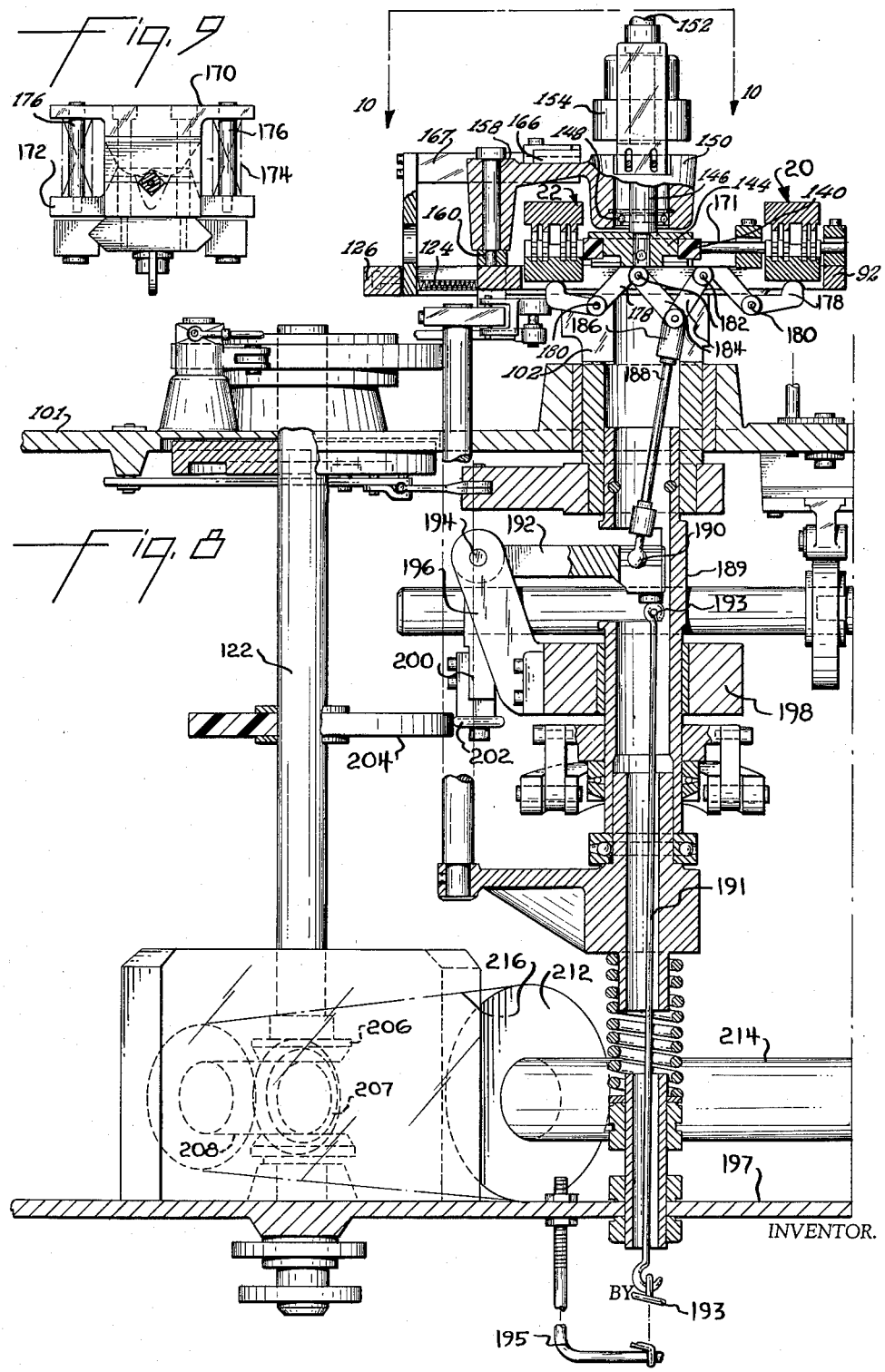

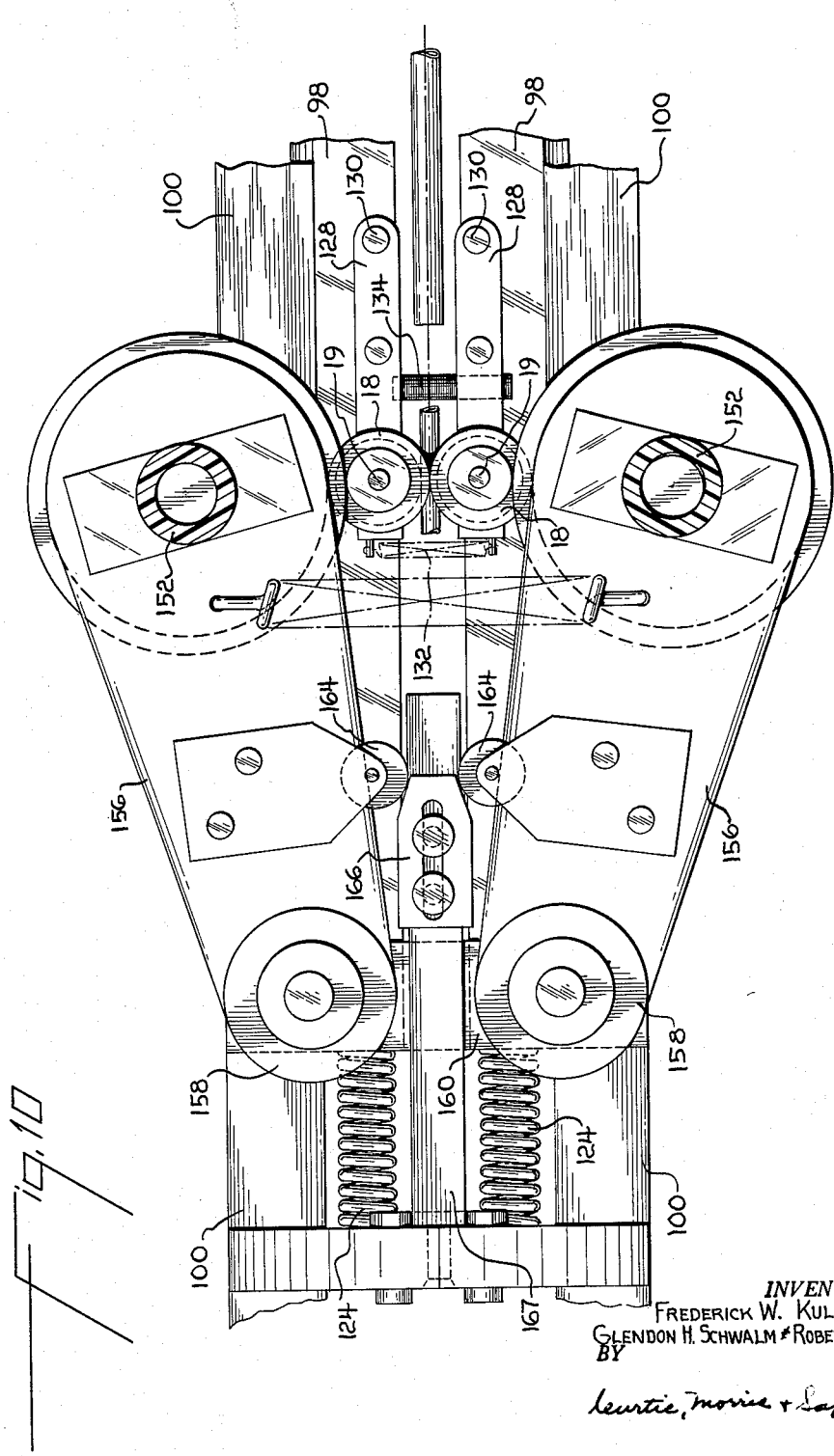

3,098,596
MEASURING AND FEEDING APPARATUS
Frederick W. Kulicke, Jr., Philadelphia, and Glendon H. Schwalm and Robert Ullman, Harrisburg, Pa., assignors to AMP Incorporated, Harrisburg, Pa.
Filed July 15, 1958, Ser. No. 748,703
3 Claims. (Cl. 226—117)

This invention relates to measuring and feeding devices for filimentary and web material. The invention is herein disclosed in an embodiment adapted for the measuring and intermittent feeding of wire, however, it will be obvious that the invention is adaptable to other uses.

An object of the invention is to provide an improved device for intermittently feeding filimentary or web material. A further object is the provision of a device for intermittently feeding material which is infinitely adjustable with regard to the length of material fed. A further object is the provision of a feeding device which intermittently feeds an accurately predetermined length of material. A further object is the provision of a feeding device capable of feeding, during intermittent intervals, a longer length of material than has heretofore been practical.

Other objects and attainments of the present invention will become apparent to those skilled in the art upon a reading of the following detailed description when taken in conjunction with the drawings in which there is shown and described an illustrative embodiment of the invention; it is to be understood, however, that this embodiment is not intended to be exhaustive nor limiting of the invention but is given for purposes of illustration in order that others skilled in the art may fully understand the invention and the principles thereof and the manner of applying it in practical use so that they may modify it in various forms, each as may be best suited to the conditions of a particular use.

In the drawings:

FIGURE 1 is a schematic representation of one form of measuring and feeding apparatus in accordance with the invention;

FIGURE 1A is a view taken along the lines 1—1 of FIGURE 1;

FIGURE 2 is a view similar to FIGURE 1 but showing the parts in the positions they occupy during a different portion of the measuring and feeding cycle of the apparatus;

FIGURE 3 is a top plan view of a mechanism for continuously measuring and feeding wire which mechanism forms part of one specific form of the invention;

FIGURE 4 is a view taken along the lines 4—4 of FIGURE 3;

FIGURE 5 is a view taken along the lines 5—5 of FIGURE 3;

FIGURE 6 is a top plan view showing intermittently actuated feed rolls which intermittently feed wire and which forms part of the specific embodiment of FIGURE 3, these feed rolls being shown in conjunction with other parts of an automatic lead-making machine for the manufacture of electrical leads;

FIGURE 7 is a view taken along the lines 7—7 of FIGURE 6;

FIGURE 8 is a view taken along the lines 8—8 of FIGURE 6;

FIGURE 9 is a view taken along the lines 9—9 of FIGURE 8;

FIGURE 10 is an enlarged fragmentary plan view showing the intermittent feed rolls and the driving means therefor.

In the schematic arrangement of FIGURES 1 and 2, the letter A denotes a continuously operating wire measuring or metering and feeding device and B denotes an intermittently actuated wire feeding device, which is disposed downstream, relative to the direction of wire travel, from the continuously operating metering and feeding device. The continuous feeding and measuring device comprises at least one continuously rotating feed wheel which, in the embodiment shown is in the form of a capstan sheave 2 secured to a continuously rotating shaft 3 and having a peripheral groove 4 which is of sufficient width to accommodate at least two side-by-side sections of the wire W. Adjacent sheave 2 there is provided a sheave 6 secured to a continuously rotating shaft 7 and having a peripheral groove into which the wire is pressed by means of a pressure roller 8 mounted for free rotation on an eccentric 9 secured to a stub shaft 10. Advantageously, a spring 12 is provided normally to urge the eccentric in a counterclockwise direction thus to press pressure roll 8 against sheave 6.

The intermittently actuated feeding device comprises a pair of rolls 18 which are mounted on shafts 19, and a pair of clamps 20, 22 disposed one on each side of the rolls 18. In this embodiment, the shafts 19 are adapted to move towards and away from the wire axis thereby to bring the rolls 18 into engagement with the wire during the feeding interval. Alternatively, the feed rolls 18 might be maintained in engagement with the wire continuously and driven only intermittently during the feeding interval. These rolls 18 may be driven by another roll or set of rolls in tangential contact with the rolls 18 or the shafts 19 may be rotated to drive these rolls. In the actual embodiment of the invention which is described below, the feed rolls 18 are continuously in contact with the wire, and these feed rolls are driven during the feeding interval by a second set of rolls which move into and out of engagement with the rolls 18.

During operation, the wire is drawn from a reel 14 through straightening rolls 16 by capstan sheave 2 around which a full turn of wire is taken. From sheave 2 the wire extends around sheave 6 and to a loop of slack wire W'. During the portion of the cycle when the wire is fed by rolls 18 to the right as shown in the drawing, the clamps 20, 22 are automatically opened and the shafts 19 move towards the wire so that rolls 18 engage the wire and project it rightwardly past severing blades 24. Since the rolls 18 must project all of the wire accumulated as slack at W', it is necessary that they have a relatively high peripheral speed, which, as a practical manner, should be sufficient to feed an amount of wire greater than that accumulated as slack at W' plus the amount measured by measuring device A during the feeding interval of rolls 18. At the end of the portion of the cycle during which wire is projected by rolls 18, the wire will be drawn taut as shown in FIGURE 2. Thereafter, clamps 20 are closed and rolls 18 are moved out of engagement with the wire, and the fed wire is severed by blades 24.

Accurate measurement of the amount of wire fed by rolls 18 is achieved by virtue of the fact that sheave 2 functions as a capstan rotating at a constant angular speed. The amount of wire withdrawn from reel 14 by this capstan can be accurately and precisely determined by reason of the fact that virtually no slippage of the wire relative to this capstan will take place. The feed rolls 18 on the other hand need not be accurately controlled as to their speed as long as their peripheral velocity is such that they are capable of feeding, during the interval when they are in contact with the wire, all of the accumulated slack at W' plus the wire measured by capstan 2 during the intermittent feeding interval. Thus the accuracy and the precision of the amount of wire fed by rolls 18 is not dependent upon the rolls 18 but is rather dependent upon a constant angular velocity of shaft 3 and upon exact timing of the opening and closing of clamps 20, 22. Such exact timing of these clamps can be achieved, for example, by means of a cam or a cam-actuated solenoid. Moreover, the maximum length of wire which can be fed by rolls 18 is not limited by a necessity for these rolls to accelerate and decelerate during their feeding interval. When these rolls are brought into engagement with the wire, they will be rotating at a high speed so that when they engage the wire, its velocity will increase almost instanteously to the peripheral speed of the rolls. At the end of the intermittent feeding interval, the rolls, in the preferred embodiment, need not be brought to a stop since feeding of the wire is brought to a halt by closure of the claims 20, 22 and disengagement of the rolls from the wire. These features permit the feeding of a relatively long length of wire in a short time interval since almost the entire interval is utilized for feeding wire at a high velocity rather than at an increasing and decreasing velocity at the beginning and the end of the interval.

It should be noted that in order for sheave 2 to function as a capstan the wire entering this capstan must be lightly tensioned and the wire extending from the capstan to sheave 6 must also be lightly tensioned. In the disclosed embodiment, the entering wire is tensioned lightly by virtue of straightening rolls 16 and the wire extending from sheave 2 to sheave 6 is tensioned by virtue of the fact that the latter sheave has a larger diameter than the sheave 2 so that its peripheral speed is greater than sheave 2, assuming that the shafts 3 and 7 have the same angular velocity.

FIGURES 3–9 show a specific embodiment of the invention as part of a fully automatic lead-making machine disclosed in the copending application of Glendon Schwalm et al., Serial No. 748,722, filed July 15, 1958, now Patent No. 3,019,679, for Lead Making Machine and Method. Only such parts of the lead making machine as are relevant to the instant invention are disclosed in these figures.

The continuous wire measuring device in this embodiment is mounted on a surface 28 (FIGURE 3) disposed adjacent the lead making machine. Power is supplied by means of a chain 32 which extends from a suitable source to a right angle drive 30 beneath the surface 28 and having an output shaft 34 with a sprocket 36 on its end. This sprocket is coupled by means of a chain 38 to a sprocket 40 on the input shaft 41 of an infinitely variable speed transmission 42. This infinitely variable speed transmission may be of the well known type comprising a pair of pulleys coupled by means of a belt or chain with each pulley being made in two parts movable and towards and away from each other so that upon movement of the two parts of one of the pulleys toward each other the effective diameter of the pulley is increased and on movement of the parts away from each the effective diameter is decreased thereby to vary the relative rotational speeds of the input shaft 41 and the output shaft 44 of the transmission. Such adjustment is achieved by means of an adjusting knob 47 extending from housing 42.

Output shaft 44 of this transmission has on its end a sprocket 46 coupled by means of a chain 48 to a sprocket 50 on the end of a shaft 52 wihch extends from a sliding gear transmission 54. This sliding gear transmission provides a shift knob or lever 56 and an output shaft 58 which supplies power to the wire measuring and feeding apparatus which is mounted on a plate 60 secured to a bracket 62. It will be understood that the combination of the infinitely variable speed transmission 42 and the sliding gear transmission 54 is provided for the purpose of permitting precise control and a wide range of speeds for shaft 58. Alternative arrangements to control the speed of shaft 58 may be used if desired.

Shaft 58 has on its end a sprocket 64 (FIGURE 5) around which a chain 66 extends to an idler sprocket 70 on a stub shaft 68, thence to a sprocket 72 on shaft 7, to an idle sprocket 74, and to a sprocket 76 on shaft 3. Sprocket 72 is not secured to shaft 7 rigidly but is contained between clamping plates 78 so that slippage of the sprocket relative to shaft is permitted under some circumstances. As explained above, it is necessary that the wire which extends from the capstan to the sheave 6 must be tensioned lightly and the provision of this slip clutch between sprocket 72 and shaft 7 permits such tensioning of the wire without undue stressing thereof. The shafts 7 and 3 extend through plate 60 and through suitable bosses thereon and mount the feed rolls 2 and 6 on the opposite side of this plate. In the specific embodiment of the invention shown, the straightening rolls 16 are mounted on a bracket 80 secured to plate 60 and the wire extends from the reel through these straightening rolls, and over a guide roll 82 rotatably mounted between ears 84 extending from plate 60. Advantageously a roller 86 mounted on one arm 88 of the bell crank secured to plate 60 is held against the groove 4 in capstan sheave 2 in order to prevent the turns of wire on this capstan from overlapping each other. An adjusting screw 90 maintains this roller against the side-by-side sections of wire in the groove. It is also desirable to provide a set of guide rolls at 87 between capustan 2 and sheave 6 in order accurately to guide the wire along its path between these sheaves.

Referring now to FIGURES 6–10, the intermittently operated feed rolls 18 are mounted on a wire carrier 92 which is normally disposed in aligned relationship with a lead carrier 94 and a wire severing and insulation cutting mechanism indicated at 96 as explained in the copending Schwalm et al. application. Wire carrier 92 comprises a slide member 98 mounted between gibs 100 secured to a rotatable spindle 102 extending from the top surface 101 of the platen of the machine. This slide member is intermittently retracted by means of a roller 104 extending from its underside which is engaged by an arcuate cam lever 106 pivoted at 108 to a block 110. The free end of this lever is coupled by means of a link 112 to one arm 114 of a bell crank pivoted at 116 and having on its other arm 117 a cam follower 118 which is engaged by a cam 120 secured to a continuously rotating shaft 122. Normally, slide member 98 is maintained in the position shown in FIGURES 6 and 10 by means of springs 124 which surround guide rods extending from an end piece 126 on the end of gibs 100 and which extend into oversized openings in the slide member. However, the slide member can be retracted against the force of the springs when the bell crank pivoted at 116 is oscillated in a clockwise direction by cam 120 thereby to swing lever 106 in a counterclockwise direction against cam roller 104.

The axis 19 of feed rolls 18 are mounted in plates 128 which in turn are pivotally secured at their ends 130 to the slide member 98, a spring 132 being provided adjacent the rolls 18 for biasing these plates towards each other and a stop screw 134 being interposed to limit the approach of the plates towards each other.

Each feed roll 18 has a smaller diameter portion 136 which serves as a power transmission roll, and a larger diameter portion 138 which is peripherally grooved to accommodate the wire as shown in FIGURE 7. The smaller diameter portions 136 of the feed rolls are in tangential contact with the fiber tires 140 clamped by means of clamps 142 on the end of drive rolls 144. These drive rolls are secured to shafts 146 (FIGURE 8) and rotatably mounted by means of bearings 148 in bosses 150. Power is supplied to shaft 146 through slip clutches not specifically shown, in housings 154 from continuously rotating flexible shafts 152 which may be coupled to a suitable driving source such as an electric motor (not shown). Thus so long as fiber tires 140 are in tangential engagement with the smaller diameter portions 146 of the feed rolls 18, these rolls will be rotated at a high angular speed.

Bosses 150 are mounted on the ends of arms 156 which in turn are pivoted by means of bosses 158 to a pivot pin extending from a block 160 mounted on slide member 98 so that when this slide member 98 retracts as previously explained, the feed wheels 18, and the driving mechanism for these feed wheels including the fiber tires 140 retracts with them. During such retraction of the slide member, the tires are disengaged from the feed wheels by means of a cam 166 mounted on the end of a bracket 167 and extending between arms 156. This cam is engaged on each side by cam rollers 164 secured by means of mounting plates to the arms 156 and its shape is such that as the slide member moves to the left from the position of FIGURE 6, the arms are pivoted outwardly and away from the axis of the wire. When the tires are disengaged from the feed rolls in this manner, feeding of the wire will come to a halt.

As explained previously, it is desirable to clamp the wire at the time when feeding or projecting of the wire by rolls 18 is scheduled to stop and this is accomplished by means of the clamps 20, 22 disposed on each side of the feed rolls.

As shown in FIGURES 8 and 9, in the lead making machine disclosed in the aforementioned Schwalm application, these clamps 20, 22 are provided in two parts 170, 172 which are biased to their open positions by means of springs 174 which surround pins 176 by means of which the clamps are secured together. The clamps are closed during the non-feeding intervals by means of bell cranks 178 pivoted at 180 to ears which depend from the underside of slide member 98. The opposite ends of these bell cranks are pivoted at 182 to links 184 which are pivotally connected to a clevis 186 on one end of a rod 188. This rod extends downwardly through spindle 102 and into an extension 189 on the end of this spindle. The end of rod 188 has a ball and socket connection 190 with one arm of a bell crank 192 pivoted at 194 to an extension 196 on a hub 198 secured to spindle extension 189. The other arm 200 of the bell crank has a cam follower 202 on its end which is engaged by a cam 204 secured to previously mentioned shaft 122. This shaft is continuously driven by means of a bevel gear 206 on its end which meshes with a bevel gear 207 on the end of a stub shaft 208. This stub shaft is coupled by means of a chain 210 and sprocket 212 to a main power shaft 214 of the machine.

Bell crank arm 192 has a connection with the hooked end of a rod 191 which extends downwardly through extension 189 and which provides a spring 193 on its end. This rod extends through a lower surface 199 of the machine frame and the spring 193 is secured to a bracket 195 anchored to surface 199. The clamps are thus maintained in their closed positions by virtue of rod 191 and spring 193 since this rod and rod 188 are normally urged downwardly as viewed in FIGURE 8 thereby to cause the bell cranks 178 to close the clamps against the force of springs 174. During the feeding intervals, these clamps are opened as cam 204 oscillates the bell crank pivoted at 194 in a counterclockwise direction thereby to urge rod 188 upwardly against the force of spring 193 and to lower the bell crank arms 178 thereby to permit the clamps to open under the force of springs 174.

The structural elements shown in FIGURE 8 which are not specifically identified are concerned with the actuation of the wire severing and insulation cutting device and with the depression or lowering of the wire carrier 92 as explained fully in the aforementioned copending Schwalm et al. application.

In use, and assuming the parts are in the positions of FIGURE 6 and tires 140 have contacted rolls 18 with concomitant opening of clamps 20, 22 the rolls feed or project the accumulated slack through severing and cutting mechanism 96 and through a guide tube 171 on lead carrier 94. Thereafter, clamps 20, 22 close and severing device 96 is actuated to sever the fed lead and cut the insulation adjacent the trailing end of the lead and adjacent the leading end of the wire. Slide member 98 then retracts, tires 140 are disengaged from the feed rolls, and the wire carrier is oscillated to position the stripped end at crimping press. Lead carrier 94 also provides a slide 98', a single clamp 168, and means 106', 112', 117', 120' for retracting this slide to strip the trailing end of the lead. This carrier is also oscillated to position the stripped trailing end of the lead at a crimping press as described in the aforementioned Schwalm et al. application.

In the specific embodiment of the invention shown in FIGURES 3-8, some of the particular advantages realized by the use of the instant wire feeding and measuring device are that long leads can be produced at a high rate of operation of the lead making machine. For example automatic lead making machines frequently operate at speeds in the range about 100 to close to 200 r.p.m., thus the cycling time of the machine will be in many instances, less than 1 second and as low as about 0.6 second. It is only during a portion of this cycling interval that the wire is fed and it will be appreciated that if a lead of say 6 feet in length is to be fed during an interval of perhaps 1/3 of a second, it is difficult to accelerate the wire to a speed sufficient to feed this amount and than to stop the wire at the end of the feeding stroke. With the instant invention on the other hand, the drive rolls are rotating at their maximum velocity when they are brought into engagement with the feed rolls 18 wire and the wire immediately accelerates to the maximum feeding velocity. Furthermore it is not necessary to stop the wire at the end of the feeding interval since the wire is drawn up taut as shown in FIGURE 2 after the slack has been fed by rolls 18.

It will be noted that with the two diameter portions of rolls 18, the smaller diameter portion 136 is in engagement with the tire 140 and the larger diameter portion 138 is in engagement with the wire. By virtue of this arrangement, a high peripheral speed is obtained on the larger diameter portion for feeding the wire, and a high rotative speed is obtained by virtue of the fact that the smaller diameter portion is in engagement with the tire. This arrangement has a further advantage in that, as a practical matter, when the clamps are closed onto the wire, there is a tendency for some slippage to take place before the slide member 98 retracts and the tires are disengaged from the feed rolls. The slip clutches 154 will of course slip relative to the rotating power shaft 152, however, there is frequently a short time lag before these clutches become effective and during the interval before they are effective, slippage will take place between rolls 18 and either the tires 140 or the wire. With the disclosed arrangement, the tendency is for the feed rolls 18 to come to a halt rather than for the rolls to slip relative to the wire. The reason for this is that since the wire is fed by the larger diameter portion of the feed rolls, the frictional force developed between the wire and the rolls is exerted on a relatively long lever arm (i.e. the larger diameter of the rolls). On the other hand, the tires 140 engage the rolls on their smaller diameter portion and the driving force can therefore be overcome, to permit the rolls to come to a halt while the tires continue to rotate, because of the smaller lever arm involved. It is preferable to have the rolls come to a halt, rather than to have the rolls slip relative to the wire, in order to avoid damage to the wire.

Changes in construction will occur to those skilled in the art and various apparently different modifications and embodiments may be made without departing from the scope of the invention. The matter set forth in the foregoing description and accompanying drawings is offered by way of illustration only. The actual scope of the invention is intended to be defined in the following claims when viewed in their proper perspective against the prior art.

We claim:

1. Means for feeding continuous material intermittently comprising a pair of feed rolls on spaced apart axes, said feed rolls having adjacent peripheral portions between which said material extends, at least one of said feed rolls having a power transmission roll mounted coaxially therewith and coupled to said feed roll for rotation therewith, said power transmission roll being of a diameter less than said feed roll, and a driving roll normally in peripheral tangential contact with said power transmission roll, and means for disengaging said driving roll from said power transmission roll during non feeding intervals.

2. Means for intermittently feeding continuous material comprising a pair of feed rolls on spaced apart axes, said feed rolls having peripheral portions which are adjacent and between which said material extends, each of said feed rolls having a power transmission roll mounted coaxially therewith and coupled thereto whereby said power transmission rolls rotate with said feed rolls, said power transmission rolls being of a diameter less than said feed rolls, a pair of driving rolls, each of said driving rolls being peripherally engageable with one of said power transmission rolls, means for disengaging said driving rolls from said transmission rolls during non-feeding intervals, and means for clamping said material during non-feeding intervals.

3. Apparatus for intermittently feeding continuous filimentary material from a substantially endless source comprising, a continuously rotatable capstan for withdrawing and metering a predetermined length of said material during a given time interval, a pair of feed wheels disposed downstream, with respect to the direction of wire feed, from said capstan, clamp means disposed between said capstan and said feed wheels, means for opening said clamp means to unclamp said filimentary material during a portion of said time interval, a variable speed driving means for rotating said capstan, and an independent driving means for rotating said feed wheels, said independent driving means being capable of driving said feed wheels at a rate at which they are capable of feeding all of said predetermined length during said portion of said time interval during which said feed wheels are in engagement with said filimentary material, said independent driving means for said feed wheels comprises at least one power transmission roll mounted coaxially with one of said feed wheels and coupled thereto, said power transmission roll being of a diameter less than said feed wheel to which it is coupled, and a continuously rotatable driving roll normally in peripheral tangential contact with said power transmission roll, and means for disengaging said driving roll from said power transmission roll during non-feeding intervals.

References Cited in the file of this patent

UNITED STATES PATENTS

| | | |
|---|---|---|
| 933,890 | Cummings | Sept. 14, 1909 |
| 1,275,984 | Bailey | Aug. 13, 1918 |
| 1,648,769 | Hugo | Nov. 8, 1927 |
| 1,888,193 | Bartell | Nov. 15, 1932 |
| 2,616,689 | Baumgartner | Nov. 4, 1952 |
| 2,832,227 | MacLeod | Apr. 29, 1958 |